US010829572B2

(12) United States Patent
Schreurs et al.

(10) Patent No.: US 10,829,572 B2
(45) Date of Patent: Nov. 10, 2020

(54) USE OF A FREE RADICAL INITIATOR COMPOSITION FOR THE PRODUCTION OF POLYETHYLENE MATERIALS HAVING A REDUCED GEL CONTENT

(71) Applicant: SABIC GLOBAL TECHNOLOGIES B.V., Bergen Op Zoom (NL)

(72) Inventors: Franciscus Petrus Hermanus Schreurs, Geleen (NL); Jan Nicolaas Eddy Duchateau, Geleen (NL); Ana Luisa Vaz, Geleen (NL); Maria Soliman, Geleen (NL); Priya Garg, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 10 days.

(21) Appl. No.: 16/461,444

(22) PCT Filed: Nov. 23, 2017

(86) PCT No.: PCT/EP2017/080155
§ 371 (c)(1),
(2) Date: May 16, 2019

(87) PCT Pub. No.: WO2018/096016
PCT Pub. Date: May 31, 2018

(65) Prior Publication Data
US 2019/0345274 A1  Nov. 14, 2019

(30) Foreign Application Priority Data
Nov. 24, 2016 (EP) .................................... 16200460

(51) Int. Cl.
*C08F 10/02* (2006.01)
(52) U.S. Cl.
CPC .......... *C08F 10/02* (2013.01); *C08F 2810/10* (2013.01)
(58) Field of Classification Search
CPC ........ C08F 10/02; C08F 8/06; C08F 2810/10; C08F 210/14; C08F 210/16; C08L 23/30; C08L 2023/40; C08L 2023/42; C08L 23/0815; C08L 23/06
See application file for complete search history.

(56) References Cited

U.S. PATENT DOCUMENTS

| 4,460,750 A * | 7/1984 | Thiersault | C08J 5/18 525/333.8 |
| 4,578,431 A * | 3/1986 | Shaw | C08F 8/00 525/333.8 |
| 5,015,693 A | 5/1991 | Duchesne et al. | |
| 5,508,319 A | 4/1996 | Denicola, Jr. et al. | |
| 6,183,863 B1 * | 2/2001 | Kawachi | B32B 27/306 428/355 AC |
| 6,485,662 B1 | 11/2002 | Neubauer et al. | |
| 7,338,994 B2 * | 3/2008 | Walton | C08L 23/10 524/114 |
| 2006/0199914 A1 * | 9/2006 | Harris | C08F 297/086 525/242 |

FOREIGN PATENT DOCUMENTS

| WO | 2018096015 A1 | 5/2018 |
| WO | 2018115224 A1 | 6/2018 |

OTHER PUBLICATIONS

Abdel-Bary, E., "Handbook of Plastic Films," Rapta Technology Limited; 2003, pp. 50-61.
European Search Report for European Application No. 16200460.0, Filing Date Nov. 24, 2016, 2 pages.
Farrell; "Low Density Polyethylene" PERP 2013-2, Dec. 2013, 6 pages.
International Search Report for International Application No. PCT/EP2017/080155 International Filing Date Nov. 23, 2017, dated Jan. 18, 2018, 3 pages.
Lloyd, L., "Olefin Polymerization Catalysts"; Handbook of Industrial Catalysts, 2011, pp. 311-350.
Written Opinion for International Application No. PCT/EP2017/080155 International Filing Date Nov. 23, 2017, dated Jan. 18, 2018, 5 pages.

\* cited by examiner

*Primary Examiner* — Robert C Boyle
(74) *Attorney, Agent, or Firm* — Cantor Colburn LLP

(57) ABSTRACT

The present invention relates to a use or process for the reduction of gels in polyethylene materials comprising at least one ethylene copolymer with a density ≥850 kg/m3 and <905 kg/m3 wherein a polyethylene material is subjected to melt processing in the presence of a free radical initiator composition characterized in that the free radical initiator composition may for example be added in quantities ≤0.050 wt. % compared to the total weight of the polyethylene material, wherein further the melt processing is performed in a melt processing unit, wherein the free radical initiator composition is dosed to the melt processing unit in a stage where the polyethylene material is in a molten condition and melt processing is conducted at a temperature of ≥160° C. and ≤240° C.

15 Claims, No Drawings

USE OF A FREE RADICAL INITIATOR COMPOSITION FOR THE PRODUCTION OF POLYETHYLENE MATERIALS HAVING A REDUCED GEL CONTENT

CROSS REFERENCE TO RELATED APPLICATIONS

This application is a 371 of International Application No. PCT/EP2017/080155, filed Nov. 23, 2017, which is incorporated by reference in its entirety, and which claims priority to European Application Serial No. 16200460.0, filed Nov. 24, 2016.

The present invention relates to a process or a use for the production of polyethylene materials having a reduced gel content. The invention also relates to polyethylenes obtained via such process or use, and to films produced from such polyethylenes.

Polyethylenes are well known materials for the production of a wide variety of products, such as for example film and sheet products. The production of such films and sheet products most commonly takes place via melt shaping, in which the polyethylene materials are brought into a molten condition, forced into a desired shape, and subsequently cooled to below their melting point.

In the production of films and sheets from polyethylene materials via melt shaping, high productivity and high product quality are paramount. In order to achieve high productivity and high product quality, the polyethylene material that is used to manufacture film and sheet materials needs to comply with certain material properties. One such property is the gel content.

In order to achieve a high productivity, the polyethylene materials preferably contain a low gel content. Gels reflect domains where the polymer molecules have to a certain degree formed domains that are not thermoplastic in nature. The presence of such domains may lead to deficiencies during the production of films, as well as to deficiencies in the film material itself. It is therefore an ongoing objective to reduce the occurrence of such gels.

Several techniques have been suggested to reduce the number of gels in polyethylene materials. An example of such is irradiation of polyethylene materials by gamma radiation or e-beam radiation. Such process is for example presented in U.S. Pat. No. 5,508,319. However, a disadvantage is that such treatment affects the melt flow characteristics of the polyethylene materials.

Another technique that has been suggested for the reduction of the number of gels in polyethylenes is the application of a melt screen in a melt extruder, for example in U.S. Pat. No. 6,485,662B1. This however has the disadvantage that pressure build-up by the screen leads to a decrease of productivity, and also induces the necessity to stop the process periodically to change or clean such screens, again leading to loss of productivity.

Another option that is suggested in the prior art in for example U.S. Pat. No. 5,015,693 is to add certain fluoropolymers to the polymer melt in the melt extruder. A disadvantage however is that the use of such fluoropolymers leads to ethylene polymers that are not qualified for use in certain applications such as certain food packaging applications. Furthermore, such fluoropolymers accumulate in the melt processing unit, which may lead to disruptions in the process.

For that reason, there is an ongoing need to develop a process or use for the reduction of the gel content of polyethylene materials. Furthermore, there is an ongoing need to develop polyethylene material having a reduced gel content, whilst still having desired optical and mechanical properties as well as melt characteristics. Also, there is a need for polyethylene films having a reduced gel content whilst still having good optical and mechanical properties. In particular, it is desired to reduce the content of gels having relatively large dimensions.

This objective has now been achieved according to the present invention by a use or process for the reduction of gels in polyethylene materials comprising at least one ethylene copolymer with a density $\geq 850$ kg/m$^3$ and $<905$ kg/m$^3$ wherein a polyethylene material is subjected to melt processing in the presence of a free radical initiator composition characterized in that the free radical initiator composition may for example be added in quantities $\leq 0.050$ wt. % compared to the total weight of the polyethylene material, wherein further the melt processing is performed in a melt processing unit, wherein the free radical initiator composition is dosed to the melt processing unit in a stage where the polyethylene material is in a molten condition and melt processing is conducted at a temperature of $\geq 160°$ C. and $\leq 240°$ C.

In the context of the present invention, polyethylene materials are to be understood to be materials that comprise at least a fraction of polyethylene. For example, the polyethylene materials comprise at least 10.0% by weight of polyethylene, compared to the total weight of the polyethylene material, alternatively at least 50.0% by weight, alternatively at least 80% by weight In the context of the present invention, optical properties may for example include properties such as haze and gloss. In the context of the present invention, mechanical properties may for example include properties such as the modulus of elasticity, tensile stress and Elmendorf tear resistance.

Such use or process provides polyethylene materials having reduced gel content, whilst still having good optical and mechanical properties, and whilst preferably maintaining melt properties such as melt mass flow rate.

An ethylene copolymer may be a copolymer of ethylene and at least one or more α-olefins may be used. The one or more α-olefin comonomers may for example be one or more selected from the group of α-olefins having $\geq 3$ and $\leq 10$ carbon atoms. Preferably the one or more α-olefin comonomers comprises an acyclic α-olefin. For example, the one or more α-olefin comonomers may be one or more selected from 1-butene, 1-pentene, 4-methyl-1-pentene, 1-hexene, 1-heptene and/or 1-octene, especially preferred 1-octene.

An ethylene copolymer according to the invention may preferably be prepared using a solution and/or slurry polymerization process. An ethylene copolymer according to the invention may be a polyolefin plastomer and/or a polyolefin elastomer.

An ethylene copolymer according to the invention may preferably have a density $\geq 850$ kg/m$^3$ and $\leq 905$ kg/m$^3$, preferably $\geq 880$ kg/m$^3$ and $\leq 900$ kg/m$^3$ Polyethylene materials may for example comprise low-density polyethylenes, linear low-density polyethylenes and/or high-density polyethylenes.

Low-density polyethylenes, also referred to as LDPE, may for example have a density as determined according to ISO 1183-1 (2012), method A of $\geq 900$ and $\leq 930$ kg/m$^3$. Low-density polyethylenes may for example be produced via high-pressure radical polymerization processes. Such high-pressure radical polymerization processes may for example be autoclave processes or tubular processes. Such processes are for example described in Nexant PERP report 2013-2 'Low Density Polyethylene'.

For example, such high-pressure free radical polymerisation process comprise more than one of said autoclave reactors and/or said tubular reactors, for example positioned in series. For example, such high-pressure free radical polymerisation process comprise two reactors in series. For example, the process may comprise a first polymerisation in an autoclave reactor and a further polymerisation in a tubular reactor. Alternatively, the process may comprise a first polymerisation in a tubular reactor and a further polymerisation in an autoclave reactor. Alternatively, the process may comprise a first polymerisation in a tubular reactor and a further polymerisation in a further tubular reactor. Alternatively, the process may comprise a first polymerisation in an autoclave reactor and a further polymerisation in an autoclave reactor.

Low-density polyethylenes may for example be obtained by polymerizing ethylene as monomer, optionally in the presence of one or more comonomers. For example, such comonomers may include 1-butene, 1-pentene, 4-methyl-1-pentene, 1-hexene, 1-heptene and/or 1-octene, bifunctional α, ω-alkadienes such as for example 1,4-hexadiene, 1,7-octadiene, 1,9-decadiene and/or 1,13-tetradecadiene, di(meth)acrylates such as 1,4-butanedioldi(meth)acrylate, hexanediol di(meth)acrylate, 1,3-butylene glycoldi(meth)acrylate, ethylene glycol di(meth)acrylate, dodecanediol di(meth) acrylate, trimethylol propane tri(meth)acrylate and/or tri (meth)acrylate ester, vinyl acetate, hydroxyethyl (meth) acrylate, hydroxypropyl (meth)acrylate, maleic acid, fumaric acid, itaconic acid, acrylic acid, methacrylic acid, crotonic acid, methyl methacrylate, ethyl methacrylate, n-butyl methacrylate, tert-butyl methacrylate, methyl acrylate, ethyl acrylate, n-butyl acrylate, 2-ethylhexyl acrylate, tert-butyl acrylate, methacrylic anhydride, maleic anhydride, itaconic anhydride.

For example, such comonomers may be present in quantities of ≤40.0% by weight, alternatively ≤30.0% by weight, alternatively ≤15.0% by weight, alternatively ≤10.0% by weight, alternatively ≤5.0% by weight, alternatively ≤3.0% by weight, compared to the total weight of the low-density polyethylene.

For example, such comonomers may be present in quantities of ≥0.05% by weight, alternatively ≥0.10% by weight, alternatively ≥0.30% by weight, alternatively ≥0.50% by weight, alternatively ≥1.00% by weight, compared to the total weight of the low-density polyethylene.

For example, such comonomers may be present in quantities of ≥0.05% and ≤40.0 by weight, alternatively ≥0.10% and ≤10.0% by weight, alternatively ≥0.30% and ≤3.0% by weight, compared to the total weight of the low-density polyethylene.

Linear low-density polyethylenes, also referred to as LLDPE, may for example have a density as determined according to ISO 1183-1 (2012), method A of ≥910 kg/m$^3$ and ≤940 kg/m$^3$.

High-density polyethylenes, also referred to as HDPE, may for example have a density as determined according to ISO 1183-1 (2012), method A of 940 kg/m$^3$ and ≤970 kg/m$^3$.

In an embodiment, the present invention relates to a use or process wherein the polyethylene material may comprise for example one or more of a low-density polyethylene, a linear low-density polyethylene or a high-density polyethylene, or mixtures thereof.

In a further embodiment, the invention relates to a use or process wherein the polyethylene material may comprise for example one or more of an ethylene copolymer having a density ≥850 kg/m$^3$ and ≤905 kg/m$^3$, preferably ≥880 kg/m$^3$ and ≤900 kg/m$^3$ and linear low-density polyethylene having a density of ≥905 kg/m$^3$ and ≤935 kg/m$^3$ or a low-density polyethylene having a density of ≥915 kg/m$^3$ and ≤935 kg/m$^3$ or a high-density polyethylene having a density of ≥936 kg/m$^3$ and ≤970 kg/m$^3$, or mixtures thereof, the density determined according to ISO 1183-1 (2012), method A.

In another embodiment, the invention relates to a use or process wherein the polyethylene material may comprise for example ≥10.0% by weight of a low-density polyethylene, a linear low-density polyethylene or a high-density polyethylene, or mixtures thereof, compared to the total weight of the polyethylene material.

Linear low-density polyethylenes and/or high-density polyethylenes may for example be obtained by polymerizing ethylene as monomer, optionally in the presence of one or more comonomers, in a slurry polymerization process, a gas phase polymerization process or a solution polymerization process, or combinations thereof. The slurry, gas phase and solution polymerization processes may be catalytic polymerization processes. Such catalytic polymerization processes are commonly operated at reaction pressures of up to 1 MPa. The catalytic polymerization processes may be operated using for example Ziegler-Natta catalyst systems, chromium-based Phillips type catalyst systems, metallocene catalysts systems, or any other catalyst system known in the art of ethylene homo- or copolymer production. Such catalyst systems are described in for example Lloyd, L., 'Olefin Polymerization Catalysts', in 'Handbook of Industrial Catalysts', p. 311-350, ISBN: 978-0-387-24682-6, 2011.

As comonomers, for example one or more α-olefins may be used. The one or more α-olefin comonomers may for example be one or more selected from the group of α-olefins having ≥3 and ≤10 carbon atoms. Preferably the one or more α-olefin comonomers comprises an acyclic α-olefin. For example, the one or more α-olefin comonomers may be one or more selected from 1-butene, 1-pentene, 4-methyl-1-pentene, 1-hexene, 1-heptene and/or 1-octene.

In case an α-olefin comonomer is used in the polymerisation, the one or more α-olefin comonomers may for example be present in an amount of ≤10.0% by weight, alternatively ≤8.0% by weight, alternatively ≤5.0% by weight, alternatively ≤4.0% by weight, alternatively ≤3.0% by weight, alternatively ≤2.0% by weight, alternatively ≤1.0% by weight, alternatively ≤0.5% by weight, compared to the total weight of the monomers.

In case an α-olefin comonomer is used in the polymerisation, the one or more α-olefin comonomers may for example be present in an amount of ≥0.01% by weight, alternatively ≥0.05% by weight, alternatively ≥0.10% by weight, compared to the total weight of the monomers.

For example, in case an α-olefin comonomer is used in the polymerisation, the one or more α-olefin comonomers may be present in an amount of ≥0.01% and ≤10.0% by weight, alternatively ≥0.05 and ≤5.0% by weight, compared to the total weight of the monomers.

In an embodiment, the linear low-density polyethylenes or high-density polyethylenes may for example be produced in a solution polymerisation process. A solution polymerisation process for the production of linear low-density polyethylenes in accordance with the present invention is to be understood to be a process in which the polymerisation is performed at for example a temperature in the range of 150-330° C., at for example a pressure in the range of 2.0-15.0 MPa, in which the reaction takes place in a an inert solvent, in which the inert solvent for example has a boiling point below the reaction temperature. For example, said solution polymerisation process is a continuous process.

In an embodiment, the linear low-density polyethylenes or high-density polyethylenes may for example be produced in a slurry polymerisation process. A slurry polymerisation process for the production of linear low-density polyethylenes in accordance with the present invention is to be understood to be a process in which the polymerisation is performed at for example a temperature in the range of 70-90° C., at for example a pressure in the range of 0.3-5.0 MPa, in which the reaction takes place in an inert diluent, in which said diluent is for example a hydrocarbon which is inert during the polymerisation process and which is in a liquid phase under the conditions occurring in the polymerisation process. For example, said diluent may be hexane. For example, said slurry polymerisation process is a continuous process.

In an embodiment, the linear low-density polyethylenes or high-density polyethylenes may for example be produced in a gas-phase polymerisation process. In an embodiment, the linear low-density polyethylenes or high-density polyethylenes may for example be produced in a gas-phase fluidized bed polymerisation process. A gas-phase polymerisation process for the production of linear low-density polyethylenes or high-density polyethylenes in accordance with the present invention is to be understood to be a process in which the polymerisation is performed in a reactor in which the polymerisation reaction takes place in a gaseous phase.

Polyethylene materials obtained with the use or process according to the present invention may for example be used for the production of films or sheets. The production of films from polyethylene materials may for example be conducted using blown film production and/or cast film production. Both processes are known in the art and described in e.g. the Handbook of Plastic Films, E. M Abdel-Bary (ed.), Rapra Technology Ltd., 2003, in sections 2.3 and 2.4. The film according to the present invention may be produced via blown film production. Alternatively, the film according to the present invention may be produced via cast film production.

Polyethylene materials obtained using the process or use of the present invention may for example be polyethylene materials directly obtained from a polymerization process, or polyethylene materials comprising additional ingredients such as for example additives. Alternatively, the additives may for example be added during the melt processing. Examples of suitable additives include but are not limited to the additives usually used for polyethylene materials, for example antioxidants, nucleating agents, acid scavengers, processing aids, lubricants, surfactants, blowing agents, ultraviolet light absorbers, antistatic agents, slip agents, anti-blocking agents, antifogging agents, pigments, dyes and fillers. The additives may be present in the typically effective amounts well known in the art, such as 0.001 weight % to 10 weight % based on the total composition.

Suitable antioxidants may for example include one or more of phenolic antioxidants, phosphites or phosphonites.

Such phenolic antioxidants may for example include one or more of octadecyl 3,5-di-t-butyl-4-hydroxyhydrocinnamate, 3-(3,5-di-t-butyl-4-hydroxyphenyl)propionic acid methyl ester, 3-(3,5-di-t-butyl-4-hydroxyphenyl)propionic acid, 2,4,6-tris-t-butyl phenol, 1,6-hexamethylene bis(3,5-di-t-butyl-4-hydroxyhydrocinnamate), pentaerythritol tetrakis(3,5-di-t-butyl-4-hydroxyphenyl)propionate, ethylenebis(oxyethylene)bis(3-t-butyl-4-hydroxy-5-methylhydrocinnamate), hexamethylenebis(3,5-di-t-butyl-4-hydroxycinnamate), thiodiethyl bis(3,5-di-t-butyl-4-hydroxyphenyl)propionate, tris(3,5-di-t-butyl-4-hydroxybenzyl)isocyanurate, (3-(3,5-di-t-butyl-4-hydroxyphenyl)propionic-1,3,5-tris(2-hydroxyethy)) isocyanurate ester, 1,3,5-trimethyl-2,4,6-tris(3,5-di-t-butyl-4-hydroxyphenyl)benzene, 3-(3,5-dt-t-butyl-4-hydroxyphenyl)propionic acid methyl ester.

Such phosphites or phosphonites may for example include one or more of triphenyl phosphite, diphenyl alkyl phosphites, phenyl dialkyl phosphites, tris(nonylphenyl) phosphite, trilauryl phosphite, trioctadecyl phosphite, distearyl pentae-rythritol diphosphite, tris(2,4-di-tert-butylphenyl) phosphite, diisodecyl pentaerythritol diphosphite, bis (2,4-di-tert-butylphenyl) pentaerythritol diphosphite, bis(2, 6-di-tert-butyl-4-methylphenyl) pentaerythritol diphosphite, bisisodecyloxy-pentaerythritol diphosphite, bis(2,4-di-tert-butyl-6-methylphenyl) pentaerythritol diphosphite, bis(2,4, 6-tri-tert-butylphenyl) pentaerythritol diphosphite, tristearyl sorbitol triphosphite, tetrakis(2,4-di-tert-butylphenyl) 4,4'-biphenylenediphosphonite, 6-isooctyloxy-2,4,8,10-tetra-tert-butyl-12H-dibenzo[d,g]-1,3,2-dioxaphosphocin, 6-fluoro-2,4,8,10-tetra-tert-butyl-12-methyldibenzo[d,g]-1, 3,2-dioxaphosphocin, bis(2,4-di-tert-butyl-6-methylphenyl) methyl phosphite, bis(2,4-di-tert-butyl-6-methylphenyl) ethyl phosphite Suitable acid scavengers may for example include one or more of zinc oxide, hydrotalcites, hydroalumites, and/or metallic stearates such as calcium stearate, zinc stearate, sodium stearate.

In an embodiment, the invention relates to a use or process wherein the free radical initiator composition may for example comprise at least one free radical initiator selected from:
  dialkyl peroxides including dicumyl peroxide, di(tert-butylperoxyisopropyl)benzene, 2,5-dimethyl-2,5-di (tert-butylperoxy)hexane, tert-butyl cumyl peroxide, 2,5-dimethyl-2,5-di(tert-butylperoxy)hexyne, di-tert-butyl peroxide;
  cyclic peroxides including 3,6,9-triethyl-3,6,9-trimethyl-1,4,7-triperoxononane, 3,3,5,7,7-pentamethyl-≥1,2,4-trioxepane; or
  hydroperoxides including isopropylcumyl hydroperoxide, 1,1,3,3-tetramethylbutyl hydroperoxide, cumyl hydroperoxide, tert-butyl hydroperoxide, tert-amyl hydroperoxide;
  and/or mixtures thereof.

In the context of the present invention, a free radical initiator composition is to be understood to be a compound that is capable of forming free radicals when subjected to conditions occurring in the melt processing unit. The free radical initiator composition may for example comprise one or more selected from organic peroxides, azides or azo compounds. Suitable organic peroxides may for example include diacyl peroxides, dialkyl peroxides, peroxymonocarbonates, peroxydicarbonates, peroxyketals, peroxyesters, cyclic peroxides, hydroperoxides. Suitable azo compounds may for example include 2,2'-azodi(isobutyronitrile), 2,2'-azodi(2-methylbutyronitrile), 1,1'-azodi(hexahydrobenzonitrile). Suitable azides may for example include organic azides such as 4-acetamidobenzene sulfonyl azide, 1-azidoadamantane, 4-azidoaniline, azidomethyl phenyl sulfide, 2-azido-4-octadecene-1.3-diol, 5-azidopentanoic acid, 3-azido-1-propanamine, 3-azido-1-propanol, 2,6-bis-(4-azidobenziliden)-4-methylcyclohexanone, ethyl azidoacetate, 4-methoxybenzyloxycarbonyl azide.

Examples of suitable diacyl peroxides are diisobutyryl peroxide, di(3,5,5-trimethylhexanoyl) peroxide, dilauroyl peroxide, didecanoyl peroxide, dibenzoyl peroxide.

Examples of suitable dialkyl peroxides are dicumyl peroxide, di(tert-butylperoxyisopropyl)benzene, 2,5-dimethyl-2,5-di(tert-butylperoxy)hexane, tert-butyl cumyl peroxide, 2,5-dimethyl-2,5-di(tert-butylperoxy)hexyne, di-tert-butyl peroxide, di-isononanoyl peroxide, di-tert-amyl peroxide, didecanoyl peroxide.

In an embodiment, the free radical initiator composition may for example comprise 2,5-dimethyl-2,5-di(tert-butylperoxy)hexane.

Examples of suitable peroxymonocarbonates are tert-amylperoxy 2-ethylhexyl carbonate, tert-butylperoxy isopropyl carbonate, tert-butylperoxy 2-ethylhexyl carbonate.

Examples of suitable peroxydicarbonates are di(3-methoxybutyl)peroxydicarbonate, di-sec-butyl peroxydicarbonate, diisopropyl peroxydicarbonate, di(4-tert-butylcyclohexyl) peroxydicarbonate, di(2-ethylhexyl) peroxydicarbonate, dibutyl peroxydicarbonate, diacetyl peroxy dicarbonate, dimyristyl peroxydicarbonate, dicyclohexyl peroxydicarbonate.

Examples of suitable peroxyketals are 1,1-di(tert-butyl peroxy)-3,5,5-trimethylcyclohexane, 1,1-di(tert-amyl peroxy)cyclohexane, 1,1-di(tert-butyl peroxy)cyclohexane, 2,2-di(tert-butyl peroxy)butane, butyl 4,4-di(tert-butyl peroxy)valerate, n-ethyl-4,4-di-(tert-butylperoxy)valerate, ethyl-3,3-di(tert-butylperoxy)butyrate, ethyl-3,3-di(tert-amylperoxy)butyrate.

Examples of suitable peroxyesters are cumyl peroxyneodecanoate, 1,1,3,3,-tetramethylbutylperoxyneodecanoate, cumyl peroxyneoheptanoate, tert-amyl peroxyneodecanoate, tert-butyl peroxyneodecanoate, tert-butyl peroxyisononanoate, tert-butyl permaleate, tert-butyl peroxydiethylisobutyrate, 1,1,3,3-tetramethylbutyl peroxypivalate, tert-butyl peroxyneoheptanoate, tert-amyl peroxypivalate, tert-butyl peroxypivalate, 2,5-dimethyl-2,5-di(2-ethylhexanoylperoxy)hexane, 1,1,3,3-tetramethylbutyl peroxy-2-ethylhexanoate, tert-amyl peroxy-2-ethylhexanoate, tert-butyl peroxy-2-ethylhexanoate, tert-butyl peroxydiethylacetate, tert-butyl peroxyisobutyrate, tert-amyl peroxyacetate, tert-butyl peroxy-3,5,5-trimethylhexanoate, tert-amyl peroxybenzoate, tert-butyl peroxyacetate, tert-butyl peroxybenzoate.

Examples of suitable cyclic peroxides are 3,6,9-triethyl-3,6,9-trimethyl-1,4,7-triperoxononane, 3,3,5,7,7-pentamethyl-1,2,4-trioxepane, 3,3,6,6,9,9,-hexamethyl-1,2,4,5-tetraoxacyclononane.

Examples of suitable hydroperoxides are isopropylcumyl hydroperoxide, 1,1,3,3-tetramethylbutyl hydroperoxide, cumyl hydroperoxide, tert-butyl hydroperoxide, tert-amyl hydroperoxide, methyl isobutyl ketone hydroperoxide, di-isopropyl hydroxyperoxide, hydrogen peroxide.

In an embodiment, the free radical initiator composition may for example comprise a free radical initiator that has a half-life time at 190° C. of ≥3.0 s, alternatively ≥5.0 s, alternatively ≥10.0 s. Free radical initiators having such half-life time are reactive over the whole of the melt processing. Use of such free radical initiators contributes to a reduction of undesired gels in the polyethylene materials.

In an embodiment, the free radical initiator composition may for example comprise a free radical initiator that has a half-life time at 190° C. of ≤60.0 s, alternatively ≤45.0 s, alternatively ≤30.0 s. Use of free radical initiators having a longer half-life time at 190° C. may result in the presence of undesired residues of unreacted free radical initiators in the polyethylene materials, which may negatively affect the quality of the polyethylene materials during subsequent processing and/or the quality of the products made using such polyethylene materials.

In an embodiment, the free radical initiator composition may for example comprise a free radical initiator that has a half-life at 190° C. of ≥10.0 s and ≤30.0 s.

In an embodiment, the invention relates to a use or process wherein the free radical initiator composition may comprise for example a free radical initiator having a half-life time at 190° C. of ≥3.0 s.

In an embodiment, the invention relates to a use or process wherein the free radical initiator composition may comprise for example a free radical initiator having a half-life time at 190° C. of ≤60.0 s.

The half-life time is determined according to the formula I:

$$t_{1/2} = \frac{\ln 2}{A \cdot e^{-\frac{E_a}{R \cdot T}}} \qquad \text{Formula I}$$

In which:
$t_{1/2}$ is the half-life time in s;
A is the Arrhenius frequency factor in $s^{-1}$;
$E_a$ is the activation energy for the dissociation of the initiator in J/mol;
R is the universal gas constant 8.3142 J/mol·K;
T is the temperature in K.

The half-life time presents the time by which at least half of the molecules of the free radical initiator have decomposed.

Examples of such free radical initiators having such half-life time at 190° C. include dialkyl peroxides such as for example dicumyl peroxide, di(tert-butylperoxyisopropyl) benzene, 2,5-dimethyl-2,5-di(tert-butylperoxy)hexane, tert-butyl cumyl peroxide, 2,5-dimethyl-2,5-di(tert-butylperoxy)hexyne, di-tert-butyl peroxide; cyclic peroxides such as for example 3,6,9-triethyl-3,6,9-trimethyl-1,4,7-triperoxononane, 3,3,5,7,7-pentamethyl-≥1,2,4-trioxepane; hydroperoxides such as for example isopropylcumyl hydroperoxide, 1,1,3,3-tetramethylbutyl hydroperoxide, cumyl hydroperoxide, tert-butyl hydroperoxide, tert-amyl hydroperoxide.

For example, the free radical initiator composition may comprise a quantity of a first free radical initiator and a quantity of a second free radical initiator, said second free radical initiator having a half-life time at 190° C. different from the half-life time at 190° C. of said first free radical initiator.

The free radical initiator composition may for example be fed to the melt processing unit of the polyethylene material at a single feed inlet. Alternatively, the free radical initiator composition may for example be fed to the melt processing unit of the polyethylene material at multiple feed inlets. In case multiple feed inlets are used, the composition of the free radical initiator composition of the first feed inlet may for example be the same as the composition of the free radical initiator composition of the second and further feed inlets. Alternatively, the composition of the free radical initiator composition may for example at each feed inlet be the same or different than the composition of the free radical initiator composition at each of the other inlets. Use of different compositions of free radical initiator compositions at different feed inlets of the melt processing unit enables the reduction of gel content of the polyethylene material by selection of the appropriate free radical initiators.

In an embodiment, the free radical initiator composition may for example be fed to the melt processing unit at a first feed inlet and/or at least a second feed inlet, wherein said first feed inlet is positioned in a zone of the melt processing unit where the polyethylene material is not in a molten state, and wherein said second feed inlet is positioned in a zone of the melt processing unit where the polyethylene material is in a molten state. For example, in case the free radical initiator composition is fed to the melt processing unit at a first feed inlet and at least a second feed inlet, wherein said first feed inlet is positioned in a zone of the melt processing unit where the polyethylene material is not in a molten state, and wherein said second feed inlet is positioned in a zone of the melt processing unit where the polyethylene material is in a molten state, the composition of the free radical initiator composition that is fed at said first feed inlet may for example be different from the composition of the free radical initiator composition that is fed at said second feed inlet. For example, in case the free radical initiator composition is fed to the melt processing unit at a first feed inlet and at least a second feed inlet, wherein said first feed inlet is positioned in a zone of the melt processing unit where the polyethylene material is not in a molten state, and wherein said second feed inlet is positioned in a zone of the melt processing unit where the polyethylene material is in a molten state, the composition of the free radical initiator composition that is fed at said first feed inlet may for example comprise a quantity of free radical initiator having a half-life time at 190° C. that is longer than the half-life time at 190° C. of that free radical initiator in the free radical initiator composition that is fed at said second feed inlet having the longest half-life time at 190° C. of the free radical initiators in the free radical composition that is fed at said second feed inlet.

The free radical initiator composition may for example be fed in a solid form. Alternatively, the free radical initiator composition may for example be fed in a liquid form. Alternatively, the free radical initiator composition may for example be fed as a solution. Examples of solvents that may be used are organic solvents such as non-polar organic solvents including pentane, cyclopentane, hexane, cyclohexane, decane, benzene, toluene and/or polar organic solvents including tetrahydrofuran, ethyl acetate, acetone, dimethylformamide, acetonitrile, propylene carbonate, formic acid, n-butanol, isopropanol, n-propanol, ethanol, methanol, acetic acid.

In an embodiment, the invention relates to a use or process wherein the free radical initiator composition may comprise for example at least one free radical initiator and a solvent The free radical composition may for example comprise ≥5.0% by weight, alternatively ≥10.0% by weight, alternatively ≥15.0% by weight, alternatively ≥20.0% by weight, alternatively ≥25.0% by weight of free radical initiator, compared to the total weight of the free radical initiator composition.

In an embodiment, the invention relates to a use or process wherein the free radical initiator composition may for example be added in quantities ≥0.001 wt % and ≤0.030 wt % compared to the total weight of the polyethylene material.

In an embodiment, the free radical initiator composition may for example be added to the polyethylene material in quantities ≥0.001 wt %, alternatively ≥0.002 wt %, compared to the total weight of the polyethylene material. In an embodiment, the free radical initiator composition may for example be added to the polyethylene material in quantities ≤0.050 wt %, alternatively ≤0.040 wt %, alternatively ≤0.030 wt %, alternatively ≤0.029 wt %, compared to the total weight of the polyethylene material. In an embodiment, the free radical initiator composition may for example be added to the polyethylene material in quantities of ≥0.001 and ≤0.050 wt %, alternatively ≥0.002 and ≤0.040 wt %, alternatively ≥0.002 and ≤0.030 wt %, alternatively ≥0.002 and ≤0.029 wt %, compared to the total weight of the polyethylene material.

In an embodiment, the free radical initiator may for example be added to the polyethylene material in quantities ≥0.001 wt %, alternatively ≥0.002 wt %, compared to the total weight of the polyethylene material. In an embodiment, the free radical initiator may for example be added to the polyethylene material in quantities ≤0.050 wt %, alternatively ≤0.040 wt %, alternatively ≤0.030 wt %, alternatively ≤0.029 wt %, compared to the total weight of the polyethylene material. In an embodiment, the free radical initiator may for example be added to the polyethylene material in quantities of ≥0.001 and ≤0.050 wt %, alternatively ≥0.002 and ≤0.040 wt %, alternatively ≥0.002 and ≤0.030 wt %, alternatively ≥0.002 and ≤0.029 wt %, compared to the total weight of the polyethylene material.

In the context of the present invention, melt processing is to be understood to be a method of processing of a polyethylene material by bringing the material in a molten condition, allowing the material to be homogeneously mixed and allowing further ingredients to be mixed into the polyethylene material whilst that polyethylene material is in molten condition. Upon melt processing, the processed polyethylene material is solidified and may for example be shaped small granules to be used in further processing steps into applications. Such melt processing may for example be performed in a melt processing unit. For example, such application may include films. In an embodiment, the polyethylene material is fed to the melt processing unit under an atmosphere that is free from oxygen, for example under an atmosphere that contains ≤0.1% by weight of oxygen, compared to the total weight of the atmosphere. For example, the polyethylene material is fed to the melt processing unit under a nitrogen atmosphere.

In an embodiment, the invention relates to a use or process wherein the melt processing may for example be conducted in a melt extruder at a temperature higher than the melting temperature of the polyethylene material and ≤240° C.

Melt processing may for example be conducted at a temperature of ≥160° C., alternatively ≥180° C., alternatively ≥200° C. Melt processing may for example be conducted at a temperature of ≤240° C., alternatively ≤220° C. For example, melt processing may be conducted at a temperature of ≥160° C. and ≤240° C., alternatively ≥180° C. and ≤220° C.

Such melt processing may for example be performed in a melt processing unit such as a melt extruder. Such melt extruder may for example be a single-screw extruder. Such melt extruder may for example be a twin-screw extruder. Such melt processing unit may comprise multiple extruders positioned in series.

The free radical initiator composition may be added to the melt processing unit in a position where the free radical initiator composition is mixed with the polyethylene material where the polyethylene material is in a solid state. Alternatively, the free radical initiator composition may be added to the melt processing unit in a position where the polyethylene material is in a molten state.

In case the melt processing of the polyethylene material is performed in a melt extruder, the free radical initiator composition may be added to the melt extruder in the feed zone. The feed zone of the extruder is the first zone in the melt extruder, from the inlet of the first polyethylene material in the extruder, in which the polyethylene material is not yet in a molten condition. In case the melt processing of the polyethylene material is performed in a melt extruder, the free radical initiator composition may be added to the melt extruder in the melt zone. The melt zone is the zone in the melt extruder subsequent to the feed zone, in which the polyethylene material is molten.

The free radical initiator composition may be added in such way that it does not lead to changes in the melt properties of the polyethylene material, such as for example the melt mass flow rate as measured in accordance with ISO 1133-1 (2011) at 190° C. and a load of 2.16 kg.

In an embodiment, the invention relates to a use or process wherein the melt processing may for example be performed in a melt processing unit, wherein the free radical initiator composition is dosed to the melt processing unit in a stage where the polyethylene material is in a molten condition or in a solid state.

Gels are to be understood to be distinct polymeric domains in the polymer material that do not show thermoplastic properties, for example wherein individual polymer molecules are chemically bound to each other as a result of crosslinking, or for example wherein polymer molecules of a high molecular weight form physical bonds which are not reversible by exposing the material to a heat processing step such as is the case in thermoplastic processing, for example by forming entanglements and/or dense crystalline domains.

The gel content may for example be determined via on-line measurement of a film produced in the cast film system using an FSA-100 optical film surface analyser equipped with software version 6.3.4.2 obtainable from Optical Control Systems GmbH, in which the surface analyser is positioned between the chill roll system and the nip rolls. The film surface analyser may comprise a CCD line scan camera with a resolution of 50 µm, enabling the identification of gels having a dimension of at least 50 µm length and 50 µm width. The film surface analyser may comprise a halogen based illumination system. A continuous image of the film surface may be produced. The determination of gels may be performed using image recognition software provided by Optical Control Systems GmbH integrated with the FSA-100 film surface analyser. A film sample with a total surface size of ≥1.0 m² may be tested, alternatively ≥5.0 m², alternatively ≥1.0 and ≤10.0 m², alternatively ≥5.0 and ≤8.0 m². The film thickness may be 40-60 µm, such as 50 µm.

The equivalent diameter of a gel is to be understood to be the average of the length and the width of the surface area of the gel as determined via on-line measurement as described above. For example, the equivalent diameter may be the average of the largest diameter of a gel and the largest diameter of said gel in a direction perpendicular direction to said largest diameter of said gel.

The present invention further relates to a polyethylene material obtained via a use or process according to the present invention.

The present invention further relates to films comprising such polyethylene material.

In an embodiment, the invention relates to a film that may be produced using a polyethylene material according to the present invention wherein the film has a gel content of ≤20.0 gels having an equivalent diameter of ≥300 µm per m² of film as determined via on-line measurement of a cast film of 6.0 m² using an optical film surface analyser.

In another embodiment, the invention relates to a film according to the present invention wherein the film may for example have a gel content of ≤6.0 gels having an equivalent diameter of ≥450 µm per m² of film as determined via on-line measurement of a cast film of 6.0 m² using an optical film surface analyser.

In an embodiment, the present invention relates to a film comprising a polyethylene material produced according to the present having a gel content of ≤3.0 gels having an equivalent diameter of ≥600 µm per m² of film as determined via on-line measurement of a cast film of 6.0 m² using an optical film surface analyser.

Films prepared using polyethylene materials according to the present invention may for example be used for packaging, such as in flexible packaging, for example food packaging, or as extrusion-coated films. Such films may for example be flexible films. Such films may for example have a thickness of ≤200.0 µm, alternatively ≤100.0 µm, alternatively ≤50.0 µm, alternatively ≤25.0 µm.

Extrusion-coated films may for example be produced by deposition of a layer of molten material onto a substrate, followed by cooling of the molten material for form a layer adhering to the substrate. For example, the molten material may comprise the ethylene polymer according to the present invention. For example, the substrate may be paper, paperboard, cardboard, foils such as aluminium foils, and/or polymer films such as polyamide films and/or EVOH films. For example, the substrate may have a top planar surface onto which the layer of ethylene polymer is deposited and a bottom planar surface. For example, such layer may have a thickness of 3.0 to 50.0 µm, for example 5.0 to 25.0 µm. For example, said layer of molten material may be deposited by extruding the molten material onto a substrate onto the top planar surface wherein the substrate is guided by a pressure roll contacting the bottom planar surface, and wherein the substrate, following deposition of the molten material, is on the side of the top planar surface contacted by a cooling cylinder that reduces the temperature of the deposited material to a temperature below the softening temperature of the deposited material.

The invention will now be illustrated by the following non-limiting examples.

Experiment I: Modification of the Polyethylenes with Free Radical Initiator.

In a twin screw extruder with a screw diameter of 27 mm, a quantity of polyethylene was fed under a nitrogen atmosphere. A quantity of free radical initiator was dosed as for example a 24 wt % solution in acetone. The polyethylene and the free radical initiator were melt mixed in the extruder, which was set to ensure a temperature of the polyethylene melt of 190° C. The extruder was operated at a screw speed of 175 RPM, and fed with such quantities of polyethylene and free radical initiator feed to ensure a throughput of 15 kg/h.

The free radical initiator was dosed to the extruder either in the feed zone (the first zone of the extruder, in which the polyethylene is not yet in a molten condition) or in the melt zone (the zone subsequent to the feed zone, in which the polyethylene is in a molten condition)

The polyethylenes that were used and the quantity of free radical initiator that was used in the examples are presented in table I.

TABLE I

| Example | Polyethylene | Free radical initiator | Free radical initiator dosing zone | Free radical initiator quantity (wt %) |
|---------|--------------|------------------------|------------------------------------|----------------------------------------|
| I       | A            | —                      | —                                  | —                                      |
| II      | A            | X                      | Feed                               | 0.010                                  |

TABLE I-continued

| Example | Polyethylene | Free radical initiator | Free radical initiator dosing zone | Free radical initiator quantity (wt %) |
|---|---|---|---|---|
| III | A | X | Feed | 0.020 |
| IV | A | X | Feed | 0.030 |

The quantity of peroxide in wt % in table I is to be understood to be the weight of the peroxide fed to the extruder compared to the weight of the polyethylene fed to the extruder, multiplied with 100%.

Polyethylene A was a commercially available linear low-density polyethylene of the grade SABIC® LLDPE 6318BE, having a density of 920 kg/m$^3$ as measured according to ISO 1183-1 (2012), method A, and a melt mass flow rate of 3.20 g/10 min as measured according to ISO 1131-1 (2011) at a temperature of 190° C. and a load of 2.16 kg, obtainable from SABIC The free radical initiator X that was used was a commercially available peroxide having the chemical name 2,5-bis(tert-butylperoxy)-2,5-dimethylhexane and CAS registry number 78-63-7, having a half-life time at 190° C. of 14.2 s.

Experiment II: Production of Films

The polymer pellets of examples I-IV obtained from experiment I were processed into single-layer films having a thickness of 25 μm by using a ME-20 extruder and a CR-8 cast film system obtainable from Optical Control Systems GmbH. The extruder was operated at a screw speed of 50 rpm, with a temperature profile along the extruder screw of 190° C. in the material feed zone to 215° in the die zone. The extruder was equipped with a die having a fish-tail design, i.e. where the width of the die opening expands in a linear way, to a width of 150 mm. The die had a die gap of 5 mm.

The cast film system comprised a dual chrome plated steel chill roll system having a temperature control system. The chill roll was operated at a temperature of 40° C. The cast film system comprised two rubber nip rolls to pull the film. The speed of the cast film system was controlled by the nip rolls to produce film at a speed of 3.9 m/min.

Gel Content Determination

The gel content was determined via on-line measurement of the film in the cast film system using an FSA-100 film surface analyser obtainable from Optical Control Systems GmbH software version 6.3.4.2, wherein surface analyser is the positioned between the chill roll system and the nip rolls. The film surface analyser comprised a CCD line scan camera with a resolution of 50 μm. The smallest defects that could be identified accordingly had a dimension of 50 μm length and 50 μm width. The film surface analyser comprised halogen based illumination system. A continuous image of the film surface was thus produced. The determination of defects was performed using image recognition software provided by Optical Control Systems GmbH integrated with the FSA-100 film surface analyser. A film sample with a total surface size of 6.0 m$^2$ was tested.

The results of the gel content determination are presented in table II.

TABLE II

| Example | Number of gels having equivalent diameter: | | |
|---|---|---|---|
|  | >300μ | >450μ | >600μ |
| I | 24.0 | 8.7 | 4.2 |
| II | 9.5 | 3.9 | 1.6 |
| III | 14.8 | 5.4 | 2.3 |
| IV | 28.0 | 8.6 | 3.3 |

By comparison of for example example I with examples II, III and IV, it becomes apparent that addition of a quantity of free radical initiator of ≤0.050% by weight reduces the gel content of the polyethylene material.

Similar results have been obtained for polyethylenes, especially ethylene-octene copolymers, having different densities, especially also for example having a densities ≥850 kg/m$^3$ and <905 kg/m$^3$, which correspond to polyethylene materials comprising at least one ethylene copolymer with a density ≥850 kg/m$^3$ and <905 kg/m$^3$ according to the invention.

It is thereby important to understand that in the present case the number of gels is measured on a thin film (25 μm) using a film surface analyser comprised a CCD line scan camera with a resolution of 50 μm.

The presented values for the number of gels indicate the number of gels present in the film sample of 6.0 m$^2$ having an equivalent diameter in the range as listed in table II.

From the presented examples, it is apparent that the use or process according to the invention may result in a reduction of the number of gels having a relatively large size, i.e. gels having an equivalent diameter >600 μm. The use or process according to the invention may further result in a reduction of the number of gels having a medium diameter, i.e. gels having an equivalent diameter >450 μm. The use or process according to the invention may further result in a reduction of the number of gels having a smaller diameter, i.e. gels having an equivalent diameter >300 μm.

The invention claimed is:

1. Melt processing of polyethylene materials, comprising melt processing a polyethylene material in a melt processing unit at a temperature of ≥160° C. and ≤240°; dosing a free radical initiator composition to the melt processing unit in a stage where the polyethylene material is in a molten condition and in quantities of ≤0.050 wt. % compared to the total weight of the polyethylene material; wherein the polyethylene material comprises an ethylene copolymer with a density ≥850 kg/m$^3$ and <905 kg/m$^3$; wherein the polyethylene material comprises one or more of a linear low-density polyethylene having a density of ≥905 kg/m$^3$ and ≤935 kg/m$^3$, a low-density polyethylene having a density of ≥915 kg/m$^3$ and ≤935 kg/m$^3$, a high-density polyethylene having a density of ≥936 kg/m$^3$ and ≤970 kg/m$^3$, or mixtures thereof, the density determined according to ISO 1183-1 (2012), method A.

2. The melt processing according to claim 1, wherein the free radical initiator composition comprises at least one free radical initiator selected from:
   dialkyl peroxides;
   cyclic peroxides; or
   hydroperoxides;
   and/or mixtures thereof.

3. The melt processing according to claim 1, wherein the free radical initiator composition comprises at least one free radical initiator and a solvent.

4. The melt processing according to claim 1, wherein the free radical initiator composition is added in quantities ≥0.001 wt % and ≤0.030 wt % compared to the total weight of the polyethylene material.

5. The melt processing according to claim 1, wherein the free radical initiator composition comprises a free radical initiator having a half-life time at 190° C. of ≥3.0 s.

6. The melt processing according to claim 1, wherein the free radical initiator composition comprises a free radical initiator having a half-life time at 190° C. of ≤60.0 s.

7. The melt processing according to claim 1, wherein the polyethylene material comprises ≥10.0% by weight of a low-density polyethylene, a linear low-density polyethylene or a high-density polyethylene, or mixtures thereof, compared to the total weight of the polyethylene material.

8. The melt processing according to claim 1, wherein the melt processing is conducted in a melt extruder at a temperature higher than the melting temperature of the polyethylene material and ≤240° C.

9. The melt processing according to claim 1, wherein the free radical initiator composition comprises at least one free radical initiator selected from dicumyl peroxide, di(tert-butylperoxyisopropyl)benzene, 2,5-dimethyl-2,5-di(tert-butylperoxy)hexane, tert-butyl cumyl peroxide, 2,5-dimethyl-2,5-di(tert-butylperoxy)hexyne, or di-tert-butyl peroxide.

10. The melt processing according to claim 1, wherein the free radical initiator composition comprises at least one free radical initiator selected from 3,6,9-triethyl-3,6,9-trimethyl-1,4,7-triperoxononane, or 3,3,5,7,7-pentamethyl-1,2,4-trioxepan.

11. The melt processing according to claim 1, wherein the free radical initiator composition comprises at least one free radical initiator selected from isopropylcumyl hydroperoxide, 1,1,3,3-tetramethylbutyl hydroperoxide, cumyl hydroperoxide, tert-butyl hydroperoxide, or tert-amyl hydroperoxide.

12. The melt processing according to claim 1, wherein the free radical initiator composition comprises at least one free radical initiator selected from: dicumyl peroxide, di(tert-butylperoxyisopropyl)benzene, 2,5-dimethyl-2,5-di(tert-butylperoxy)hexane, tert-butyl cumyl peroxide, 2,5-dimethyl-2,5-di(tert-butylperoxy)hexyne, di-tert-butyl peroxide, 3,6,9-triethyl-3,6,9-trimethyl-1,4,7-triperoxononane, 3,3,5,7,7-pentamethyl-≥1,2,4-trioxepane, isopropylcumyl hydroperoxide, 1,1,3,3-tetramethylbutyl hydroperoxide, cumyl hydroperoxide, tert-butyl hydroperoxide, tert-amyl hydroperoxide, and/or mixtures thereof.

13. The melt processing according to claim 1,
wherein the free radical initiator composition comprises at least one free radical initiator and a solvent;
wherein the free radical initiator composition is added in quantities ≥0.001 wt % and ≤0.030 wt % compared to the total weight of the polyethylene material; and
wherein the free radical initiator composition comprises a free radical initiator having a half-life time at 190° C. of ≥3.0 s to ≤60.0 s.

14. The melt processing according to claim 13, wherein the free radical initiator composition comprises at least one free radical initiator selected from: dicumyl peroxide, di(tert-butylperoxyisopropyl)benzene, 2,5-dimethyl-2,5-di(tert-butylperoxy)hexane, tert-butyl cumyl peroxide, 2,5-dimethyl-2,5-di(tert-butylperoxy)hexyne, di-tert-butyl peroxide, 3,6,9-triethyl-3,6,9-trimethyl-1,4,7-triperoxononane, 3,3,5,7,7-pentamethyl-≥1,2,4-trioxepane, isopropylcumyl hydroperoxide, 1,1,3,3-tetramethylbutyl hydroperoxide, cumyl hydroperoxide, tert-butyl hydroperoxide, tert-amyl hydroperoxide, and/or mixtures thereof.

15. The melt processing according to claim 13,
wherein the polyethylene material comprises ≥10.0% by weight of a low-density polyethylene, a linear low-density polyethylene or a high-density polyethylene, or mixtures thereof, compared to the total weight of the polyethylene material; and
wherein the melt processing is conducted in a melt extruder at a temperature higher than the melting temperature of the polyethylene material and ≤240° C.

\* \* \* \* \*